# United States Patent Office 3,128,042
Patented Apr. 7, 1964

3,128,042
TEMPERATURE CONTROL SYSTEMS FOR MULTI-
ZONE, BATCH-TYPE FURNACES
Herman L. Daneman, Gwynedd, Pa., assignor to Leeds
and Northrup Company, Philadelphia, Pa., a corporation of Pennsylvania
Filed Oct. 13, 1960, Ser. No. 62,497
4 Claims. (Cl. 236—15)

This invention relates to control of the temperature of multi-zone furnaces.

In accordance with the present invention, the different zones of a multi-zone furnace are brought to a predetermined temperature at a maximum uniform rate by using the temperature of that zone which has the slowest rate of change as a reference for regulation of the temperature of each of the other zones. More particularly, the rate of supply of a temperature-changing agent to each of the faster zones is varied to maintain a match between signals respectively representative of the temperature of that zone and of the temperature of the slowest zone to which the temperature-changing agent may be supplied at preset or programmed rate.

More specifically, at the beginning of a heat-up period, the temperature-changing agent is supplied at high rate to all zones but subsequently whenever the temperature of one of the zones tends to change more rapidly than the temperautre of the slowest zone, the rate of supply of the agent to such faster zone is temporarily reduced to extent dependent upon the difference between said temperatures to insure that at all times there is uniformity of temperature throughout the furnace. When the desired furnace temperature is attained, the rate of supply of the agent to the slowest zone is varied to maintain the temperature of that zone at the desired value as represented by a primary reference signal and the rate of supply of the agent to each of the other zones is varied to maintain its temperature at the existing temperature of the slowest zone as represented by a secondary reference signal.

The invention further resides in control systems and methods having the features of novelty hereinafter described and claimed.

Figure 1:
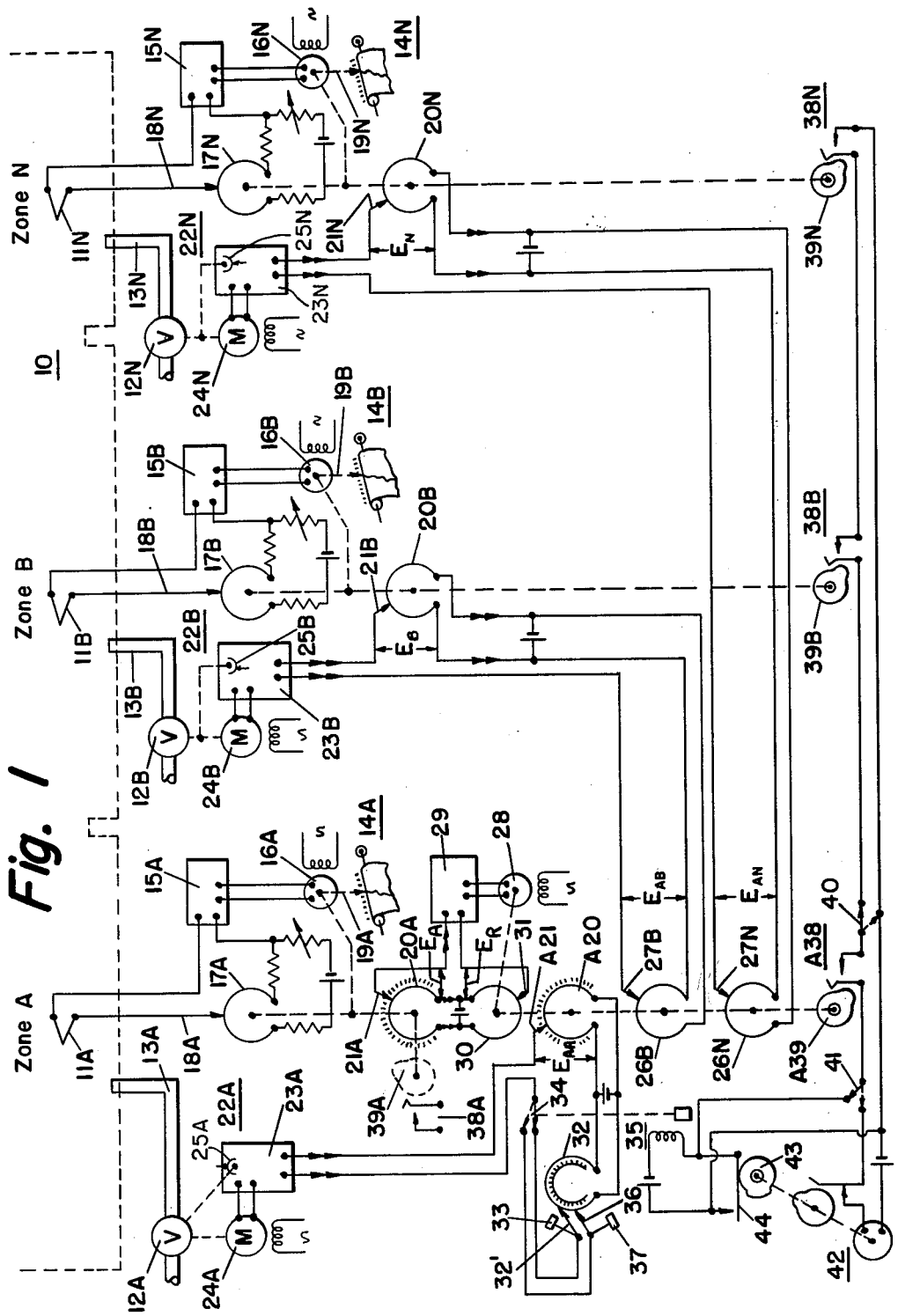

For a more detailed understanding of the invention, reference is hereinafter made to the accompanying drawings in which:

FIG. 1 schematically illustrates a control system for a multi-zone furnace; and

Figure 2:
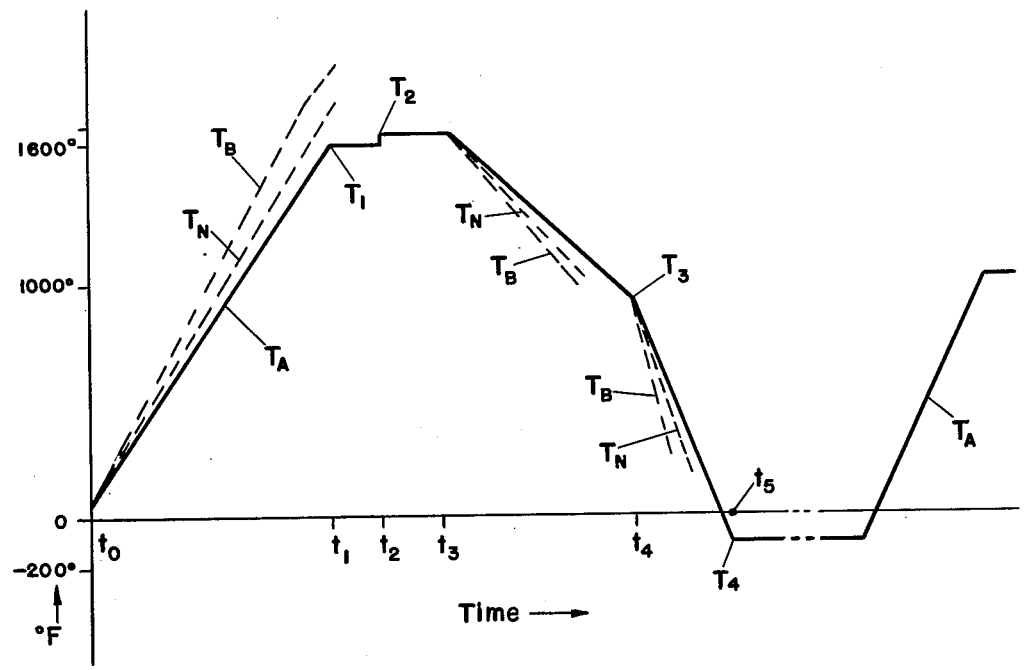

FIG. 2 is an explanatory figure referred to in discussion of FIG. 1 as used for a brazing operation.

Referring to FIG. 1 as illustrative of the invention when applied to controlling a multi-zone brazing furnace 10 used in fabrication of large stainless steel honeycomb panel sections for supersonic aircraft and missile structures, the temperatures of the zones A–N are respectively monitored by temperature-responsive devices such as thermocouples 11A–11N disposed in the corresponding zones. Assuming the furnace 10 is of the gas-fired type, the inputs to the zones A–N are determined by the settings of the valves 12A–12N in the gas supply lines 13A–13N to the different zones.

Assume that because of greater work-load, furnace construction, lower gas pressure or other reason zone A is the slowest zone, then if the maximum rate of heating is applied to each zone, the temperature of zone A, as shown by the indicator or recorder 14A associated with thermocouple 11A may rise toward pre-brazing temperature $T_1$ (FIG. 2) generally as shown by the solid-line curve $T_A$ of FIG. 2. The temperatures of the other zones B–N tend to rise at more rapid rate, as indicated by broken-line curves $T_B$–$T_N$ so that in absence of the control hereinafter described, these zones would reach temperature $T_1$ substantially before zone A and would be substantially above temperature $T_1$ at time $t_1$ when zone A reaches temperature $T_1$.

However, during this heat-up period the progressively rising temperature of zone A is used as a reference for varying the setting of input valves 12B–12N of the faster zones. Whenever the temperature of any one of the faster zones exceeds that of the slowest zone A, as may be shown by the corresponding one of the indicators-recorders 14B–14N, its input is reduced by increasing the throttling action of the corresponding input valve. Whenever, because of such increased throttling, the temperature of any one of the faster zones becomes less than that of zone A, its input is increased by further opening of the input valve of the corresponding zone. This regulation of input to each of the faster zones during the heat-up time $t_0$–$t_1$ makes its temperature closely follow that of zone A at all times regardless of the then existing temperature of any other fast zone. Thus, during the heat-up period, the rate of temperature rise of all zones is made closely to conform with that of the slowest zone A.

When all zones have reached the predetermined pre-brazing temperature $T_1$, or at a predetermined time $t_2$ after the slowest zone has reached and is maintained at such temperature by regulation of input valve 12A, the input to zone A is controlled for further rise of its temperature to a predetermined higher brazing temperature $T_2$ at which it is maintained by regulation of input valve 12A. Throughout this pre-brazing and brazing interval $t_1$–$t_3$, the input to each of the faster zones is increased and decreased as required to maintain its temperature within a few degrees of the temperature of a zone A which continues to serve as a reference for varying the setting of the input valve of the faster zones. By this method of control, temperature gradients in the work, which work extends through the various zones, are minimized at all times during rapid heating of the work from its initial room temperature to brazing temperature and during the brazing operation.

The same method of control may be used to minimize temperature gradients during cooling of the work from brazing temperature. Cooling may be effected by reducing the rate of supply of fuel gas, or the temperature-changing agent supplied by lines 13A–13N to the corresponding zones A–N may be changed from fuel gas to a cooling gas, such as air or $CO_2$. In any event, for cooling, the input valve 12A of the slowest zone A is preset to reduce the temperature of zone A at suitably high rate and the resulting falling temperature of that zone is used as a reference throughout the time interval $t_3$–$t_4$ for varying the settings of the input valves of each of the faster zones to maintain its temperature within a few degrees of that of the reference zone A. When zone A reaches a predetermined lower temperature $T_3$, its cooling gas input may be further increased for still more rapid cooling to a lower temperature, such as sub-zero temperature $T_4$. Throughout this accelerated cooling interval $t_4$–$t_5$, the falling temperature of the slow zone A is still used as a reference for varying the setting of the input valves of each of the faster zones to maintain its temperature within a few degrees of zone A.

Temperature gradients in the work may be similarly minimized in any further cooling or heating of the work during aging in the furnace. Such further treatment is indicated in FIG. 2 by continuation of the curve $T_A$ beyond time $t_5$. In brief, throughout the whole or any part of a work-heating or work-cooling program such as exemplified by FIG. 2, the temperature throughout a multi-zone furnace may be kept essentially uniform by varying the input to each of the faster zones so that its temperature closely follows the change in temperature of the slowest zone.

In the arrangements of FIG. 1, the electrical output of each of the thermocouples 11A–11N may be converted into an indication of the temperature of the corresponding zone by utilizing it as an input of a self-balancing indicator or recorder of any suitable type. Since these instruments 14A–14N may be similar, it will suffice to describe one of them using the same reference characters to identify corresponding elements with addition of a letter suffix corresponding with the associated zone. The recorder 14A, for example, includes an amplifier 15A whose output provides excitation for a reversible motor 16A mechanically coupled to effect adjustment of a potentiometer slidewire 17A relative to its contact 18A. The output voltages of thermocouple 11A and slidewire 17A are in series-opposition in the input circuit of amplifier 15A. When these voltages are not in balance, the resulting output of amplifier 15A causes motor 16A to effect a rebalancing adjustment of slidewire 17A and a corresponding change in position of the temperature-indicating pointer or pen 19A.

The foregoing method of control may be effected by manual adjustment of the input valves using the visual signals produced by the recorder-indicator to insure that the temperature of each of the faster zones is made closely to follow the temperature of the slowest zone.

For automatic control purposes, each of the rebalancing motors 16A–16N is also coupled to effect adjustment of a corresponding control slidewire 20A–20N relative to its contact 21A–21N. The output voltages $E_A$–$E_N$ of these slidewires therefore constitute electrical signals respectively representative of the temperatures existing in the furnace zones A–N.

Again assuming that zone A is the slowest zone of furnace 10, the signal $E_A$ representing the temperature of zone A is, in effect, used as a reference against which each of the other signals $E_B$–$E_N$ is compared for automatic control of the input valves 12B–12N so that the temperature of each of the faster zones B–N is made closely to follow the temperature of zone A. More specifically, the setting of input valve 12B for zone B is adjustable by controller 22B including an amplifier 23B upon whose input circuit is impressed the signal $E_B$ representing the temperature of zone B and a signal $E_{AB}$ produced as later described, representing the temperature of zone A. When those signals are mismatched or not in balance, the resulting output of amplifier 23B causes motor 24B to change the setting of input valve 12B in proper sense to bring the temperature of zone B toward that of zone A. The slidewire 25B coupled to valve 12B is adjusted concurrently therewith by motor 24B to rebalance controller 22B for the existing mismatch between its input signals $E_B$ and $E_{AB}$. Each other fast zone, exemplified by zone N, is similarly controlled to maintain balance between a signal $E_N$ representative of the temperature of that zone and a signal $E_{AN}$, produced as later described, representative of the temperature of the slowest zone A. When those signals as applied in opposition to each other in the input circuit of amplifier 22N are not in balance, the resultant amplifier output is effective through a motor 24N to change the setting of valve 12N in proper sense to bring the temperature of zone N toward that of the slow reference zone A.

The slidewires 26B–26N, in number corresponding with the number of fast zones, are automatically adjusted relative to their respective contacts 27B–27N so that signal voltages $E_{AB}$–$E_{AN}$ respectively produced by them are each representative of the existing temperature of the slow zone A. To that end, these slidewires may be mechanically coupled to the rebalancing motor 16A for adjustment concurrently with rebalancing adjustment of the measuring slidewire 17A: preferably however, to avoid overloading of this motor and to simplify the change in circuit connections when another zone may be the slowest zone, the temperature-reference slidewires 26B–26N are mechanically coupled to a master controller motor 28 for adjustment in unison to follow the changes in temperature of the slowest zone.

To effect such follow-up adjustment, the motor 28 is included in the output circuit of the master controller amplifier 29. The input circuit of amplifier 29 includes the control slidewire 20A which as above described produces a signal voltage $E_A$ representative of the existing temperature of zone A. The input circuit of amplifier 29 also includes the follow-up or repeater slidewire 30 which is adjustable relative to its contact 31 by motor 28 of the master controller. When the output voltage $E_R$ of the repeater slidewire 30 does not balance the temperature signal voltage of slidewire 20A, the resultant output of amplifier 29 energizes the motor 28 to effect rebalancing adjustment of slidewire 30 to a position corresponding with the existing temperature of zone A. Since the slidewires 26B–26N are concurrently re-positioned, their output voltages $E_{AB}$–$E_{AN}$ each represent the temperature of zone A for use, as above described, as a reference or set point for the controllers 22B–22N which automatically control the input valves 12B–12N of the fast zones of furnace 10. Thus, during the heat-up period $t_0$–$t_1$, the fuel input to each of the fast zones B–N is automatically varied to keep its temperature within a few degrees of the temperature of the slow zone A.

The temperature of the slow zone A is also represented by the temperature-signal voltage $E_{AA}$ which, in the arrangement shown, is produced by slidewire A20 adjustable by motor 28 relative to slidewire contact A21. In the input circuit of controller 22A for the input valve 12A of zone A, this temperature signal is opposed to that produced by a calibrated slidewire 32 whose contact 32' is set, as by knob 33, to a position corresponding with the pre-brazing temperature $T_1$. Thus, as the temperature of zone A passes the predetermined pre-brazing temperature $T_1$, the signal $E_{AA}$ exceeds the signal produced by slidewire 32 and motor 24A responds to the resultant output of amplifier 23A to reduce the heat input to zone A. From this point on, the heat input to slow zone A is alternately increased and decreased by regulating action of controller 22A upon input valve A to maintain the temperature of this zone at the pre-brazing temperature $T_1$ set by knob 33 or equivalent.

In accordance with one mode of further control of the furnace, attained with switches 40, 41 in the full-line position shown, when all zones have reached the pre-brazing temperature $T_1$, the slidewire 32 is effectively reset for a somewhat higher brazing temperature $T_2$. In the arrangement shown, this resetting of the control point for controller 22A of zone A is accomplished by the switch 34 which is actuated by relay 35 to the dotted-line position when all zones are at pre-brazing temperature $T_1$. With switch 34 in such position, the slidewire contact 36 which has been preset by knob 37 to a position corresponding with brazing temperature $T_2$ is substituted for contact 32' in the input circuit of the controller amplifier 23A.

The energization of relay 35 may be controlled by serially-connected switches whose operating cams are individually positioned in accordance with the temperature existing in the corresponding zone. For such purpose, the recorders 14A–14N may be provided with cams 39A–39N coupled for movement by their respective slidewire shafts relative to their respective switches 38A–38N. By arrangement per se known, the switches or their operating cams may be angularly set with respect to the axis of the slidewise shaft to a position corresponding with the pre-brazing temperature $T_1$. In the master controller arrangement shown, the function of the cam 39A and cam switch 38A of the slow zone A may be taken over by the cam A39 and cam switch A38 of the separate master controller.

With either arrangement, when all cam switches are closed, i.e., all zones at pre-brazing temperature, the relay 35 is energized to shift the primary temperature reference or controller set-point for slow zone A from the lower to the higher temperature setting of slidewire 32. The secondary reference or controller set-point for each of the other zones continues to be the existing temperature of slow zone A as represented by the output signals of slave slidewires 26B–26N.

In accordance with another mode of control subsequent to the heat-up period, the primary reference slidewire 32 is effectively reset to brazing temperature $T_2$ a predetermined time after the slow zone A has reached the pre-brazing temperature $T_1$. In the arrangement shown, this is effected with switches 40, 41 in the dotted-line position. When cam switch A38 is closed, i.e., when slow zone A arrives at pre-brazing temperature $T_1$, the timer 42 is energized. After a predetermined interval of say five to ten minutes, preset by adjustment of timer cam 43, the timer switch 44 is closed to energize relay 35, which thereupon resets the primary reference slidewire 32 to brazing temperature $T_2$, as above described, for control of the temperature of zone A. The existing temperature of slow zone A as represented by the secondary reference signals $E_{AB}$–$E_{AN}$ continues to serve as a secondary reference for control of the temperature of each fast zone B–N so that the temperature of each of them is independently made closely to follow the temperature of zone A.

In the system shown, the controllers 22A–22N for controlling the input valves of a gas-fired furnace may be of the type shown in U.S. Letters Patent Nos. 2,830,244 and 2,830,245 having provision for proportional rate and reset control actions. The invention, however, is not restricted for application to gas-fired furnaces: when, for example, the furnace is of the electric type, the input control devices 12A–12N may be saturable reactors or switches and the controllers 22A–22N may be of the type shown in U.S. Letters Patent No. 2,797,291.

In general it shall be understood that the invention is not limited to the particular control arrangement illustrated and described but that variations and modifications thereof are within the scope of the invention as defined by the following claims.

What is claimed is:

1. A system for controlling a multi-zone furnace comprising a plurality of means for producing signals respectively representative of the existing temperatures of said zones, means preset to provide a first set-point signal representative of the desired initial high temperature of all zones and a second set-point signal representative of a somewhat higher desired temperature of all zones, means for regulating the rate of supply of a temperature-changing agent to one of said zones including means initially responsive to mismatch between said first set-point signal and the temperature signal of that zone, means for regulating the rate of supply of a temperature-changing agent to each of the other of said zones including means responsive to mismatch between its existing temperature signal and a signal representative of the existing temperature of said one zone, and means effective when at least said one of said zones has reached said desired initial high temperature for shifting from said first set-point signal to said second set-point signal for further control of the temperature of said one of the zones by its regulating means, the control of temperature of each of the other zones continuing as before by its corresponding regulating means.

2. A system as in claim 1 in which the means for shifting from said first set-point signal to said second set-point signal is effective only upon attainment by all zones of the desired initial high temperature.

3. A system as in claim 1 in which the last means additionally includes timing means effective after a predetermined interval to shift to the somewhat higher set point for the first-named regulating means.

4. A system as in claim 1 in which the last means is responsive only to attainment by all zones of the desired initial high temperature and additionally includes timing means effective only after a predetermined delay to shift to the somewhat higher set point for said first-named regulating means.

References Cited in the file of this patent

UNITED STATES PATENTS

| | | |
|---|---|---|
| 1,603,729 | Wilhjelm | Oct. 19, 1926 |
| 2,326,238 | Mabey | Aug. 10, 1943 |
| 2,337,410 | Peters | Dec. 21, 1943 |
| 2,518,996 | Peckham | Aug. 15, 1950 |
| 2,871,869 | Howard | Feb. 3, 1959 |
| 2,998,195 | Kahn | Aug. 29, 1961 |
| 3,043,517 | Hanna | July 10, 1962 |

FOREIGN PATENTS

| | | |
|---|---|---|
| 637,312 | Great Britain | May 17, 1950 |